May 19, 1925.
E. A. JOHNSON
LOCK WASHER
Filed Aug. 18, 1924
1,538,559
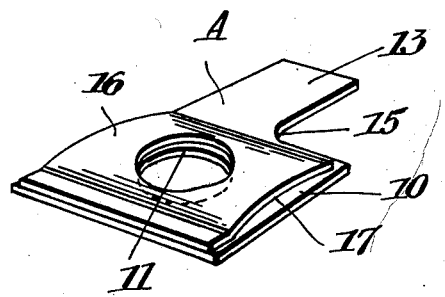
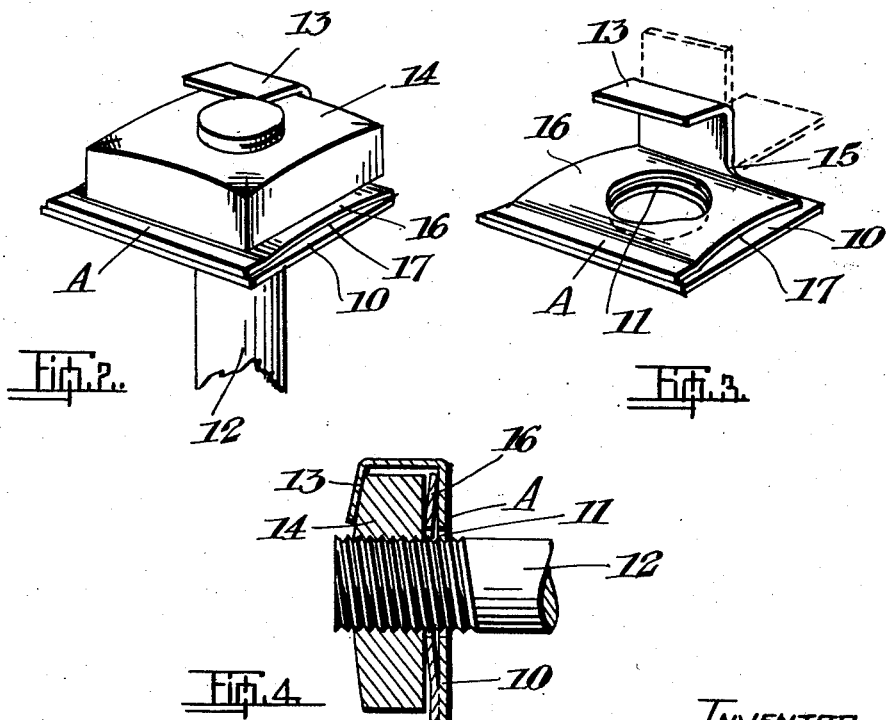
INVENTOR
EDWARD ANGUS JOHNSON.
BY
ATTYS.

Patented May 19, 1925.

1,538,559

UNITED STATES PATENT OFFICE.

EDWARD ANGUS JOHNSON, OF NEW GLASGOW, NOVA SCOTIA, CANADA.

LOCK WASHER.

Application filed August 18, 1924. Serial No. 732,727.

*To all whom it may concern:*

Be it known that I, EDWARD ANGUS JOHNSON, a subject of the King of Great Britain, and resident of New Glasgow, in the Province of Nova Scotia and Dominion of Canada, have invented certain new and useful Improvements in Lock Washers, of which the following is a specification.

This invention relates to improvements in lock washers and the objects of the invention are to provide a simply constructed and effective form of lock washer by which a nut may be readily retained on a bolt and which may be manufactured in large quantities at low cost and which consists of the improved washer described in detail in the accompanying specification and drawings.

Figure 1 is a perspective view of the lock washer.

Figure 2 is a perspective view of the same on the bolt in locking position.

Figure 3 is a perspective view of the lock washer itself in locked position with alternative positions indicated in dotted lines.

Figure 4 is a sectional view of the lock washer on the bolt in locking position.

Referring to the drawings in which like characters of reference indicate corresponding parts in each figure, A designates the lock washer comprising a rectangular plate 10 having a central perforation 11 through which the bolt 12 may extend. One side of the plate 10 is formed with a lateral extension or projection 13 also rectangular in form and designed to be bent about the nut 14 as shown in Figures 2 and 4. The length of the projection 13 is such that it may be bent closely against the side and over the top of the nut 14.

It will be noted that the inner corner 15 between the projection 13 and the side of the plate 10, from which it extends, is rounded to lessen the possibility of cracks occurring.

In combination with the foregoing with the projection described is a plate 16 of rectangular formation and having an opening therein registering with the perforation 11. This plate 16 is designed to fit on the plate 10 and to be secured therethrough in any well known manner preferably by being welded or riveted at one side, the body portion of the plate being sprung or offset at 17 to impart a spring action therethrough so that when the nut 14 is screwed home and as shown in Figures 2 and 4 and the projection 13 bent to overlap it the plate 16 will act as a spring in opposition exerted by the folded projection 13 to lock the nut securely on the bolt.

From the foregoing it will be noted that my lock washer is particularly adaptable for railroad work and that in fitting it the spring plate 16 fits next to and in contact with the rail, and then the washer plate 10 next to the nut. It can also be used, as illustrated and described, with the nut next the spring plate, and in both cases the lip 13 is formed accordingly. In other words, the spring-actuated means exercised by the plate 16 are adapted to be used on either side of the washer.

As many changes could be made in the above construction and many apparently widely different embodiments of my invention within the scope of the claims, constructed without departing from the spirit or scope thereof, it is intended that all matter contained in the present specification shall be interpreted in an illustrative and not in a limiting sense.

What I claim as my invention is:

1. A rectangular plate having a central perforation, a rectangular projection of less width than the plate extending from one side thereof and designed to be bent against the side and over the top of a nut, a spring plate of spring steel on the rectangular plate having a central perforation registering with the said plate perforation.

2. The lock washer as claimed in claim 1, in which a rounded corner is formed between the plate and the projection.

3. A lock washer comprising a rectangular plate having a central perforation and formed with a projection adapted to be bent against the side and over the top of a nut, a second rectangular plate with a central perforation adapted to fit over the first-mentioned plate and to be fixedly secured at its edges thereto, the central portion of the second plate being upwardly sprung or offset to form spring actuating means adapted to contact with a nut.

4. In a device of the character described the combination with a centrally perforated plate formed with an extension adapted to be bent at right-angles to the plate and then at right-angles to itself, of a second perforated plate of spring steel adapted to be welded or riveted on the first mentioned plate and designed to form spring actuating means thereon in opposition to said bent extension.

5. A device of the character described comprising a plate provided with an extension adapted to form when bent a lip to embrace the sides and top of a nut, a spring plate of similar formation to the aforementioned plate but without the extension and designed to be fixedly secured on said plate, and a bolt aperture through said plates.

In witness whereof I have hereunto set my hand in the presence of two witnesses.

EDWARD ANGUS JOHNSON.

Witnesses:
 JOHN DOULL,
 ROSE GILLIS.